US007816643B2

(12) United States Patent
Hyodo

(10) Patent No.: US 7,816,643 B2
(45) Date of Patent: Oct. 19, 2010

(54) NEUTRAL ATOM TRAPPING DEVICE

(75) Inventor: Masaharu Hyodo, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 816 days.

(21) Appl. No.: 11/714,557

(22) Filed: Mar. 6, 2007

(65) Prior Publication Data

US 2008/0073494 A1 Mar. 27, 2008

(30) Foreign Application Priority Data

Mar. 8, 2006 (JP) ............................ 2006-061964

(51) Int. Cl.
*G21K 5/00* (2006.01)
*H01S 4/00* (2006.01)

(52) U.S. Cl. ...................................................... 250/251

(58) Field of Classification Search .................. 250/251
See application file for complete search history.

(56) References Cited

U.S. PATENT DOCUMENTS 7,030,370 B1 * 4/2006 Crookston et al. .......... 250/251
2001/0042824 A1 * 11/2001 Bouyer et al. ............... 250/251
2002/0117612 A1 * 8/2002 Kumagai et al. ............ 250/251
2006/0214096 A1 * 9/2006 Pau ............................ 250/251
2007/0176098 A1 * 8/2007 Wells ......................... 250/292
2007/0272853 A1 * 11/2007 Konenkov et al. ........... 250/292

OTHER PUBLICATIONS

J. Reichel, et al., "*Atomic Micromanipulation with Magnetic Surface Traps*"; Phys. Rev. Lett. 83, 3398 (1999); pp. 3398-3401.

S. Wildermuth, et al.; "*Optimized Magneto-Optical Trap for Experiments With Ultracold Atoms Near Surfaces*"; Phys. Rev. A69, 030901(R), 2004; pp. 1-4.

* cited by examiner

*Primary Examiner*—Jack I Berman
*Assistant Examiner*—Nicole Ippolito Rausch
(74) *Attorney, Agent, or Firm*—Osha • Liang LLP

(57) ABSTRACT

A neutral atom trapping device with a multipole-magnetic field-generating electrode is provided with a main current electrode through which main current flows, and a pair of sub-current electrodes through which sub-current flows, and which is located in parallel to and both sides of said main current electrode; a neutral atom trapping device with an S-shaped multipole-magnetic field-generating electrode.

18 Claims, 11 Drawing Sheets

NEUTRAL ATOM TRAPPING DEVICE

BACKGROUND OF THE INVENTION

1. Field of the Invention

The present invention relates to a neutral atom trapping device, and in particular to a neutral atom trapping device which specializes a multipole-magnetic field-generating electrode in a magneto-optical trap or/and a magnetic trap to enhance a magnetic quadrupole component while attenuating a magnetic hexapole component in the region where neutral atoms are captured, so that neutral atoms can be effectively captured, and which reduces an applied current and/or an external magnetic field by generating the magnetic field, thereby enabling miniaturization of the whole device.

2. Description of the Related Art

Magneto-optical trap [MOT] is a publicly-known technology in the field of atom optics. By using a magneto-optical trap, neutral atoms can be captured by irradiating laser beams of well-adjusted oscillating frequency along the axis of symmetry of the magnetic field lines in a quadrupole magnetic field. Since a magneto-optical trap can capture neutral atoms in the central region thereof and simultaneously perform the laser cooling, it is used as a method of cooling for most of the experiments in the field of atom optics including the Bose-Einstein condensate-generation experiment.

Generally, a quadrupole magnetic field in a magneto-optical trap is generated using anti-Helmholtz coils which are formed by placing a pair of circular coils opposite each other. However, as will be described below, a quadrupole magnetic field can also be generated by superposing a magnetic field, which is generated by an electric current flowing through a single linear wire, on a uniform bias magnetic field.

FIGS. 1(*a*) and 1(*b*) are conceptual diagrams showing relationships between an electric current and a magnetic field. FIG. 1(*a*) is a drawing showing a condition of a magnetic field when an infinite linear current (I) flows along an electrode (1) on the z-axis, while FIG. 1(*b*) is a drawing showing a condition of a magnetic field when a uniform bias magnetic field is further applied in the positive (+) direction on the x-axis. As shown in FIG. 1(*a*), when the infinitely long linear current (I) flows along the electrode (1) on the z-axis, a concentric circular magnetic field is generated around the linear current (I) due to Ampere's law. The magnetic flux density of the magnetic field thus generated is indicated by the following equation (i):

$$B_x = -\frac{\mu_0 I}{2\pi}\frac{y}{x^2+y^2}, \quad B_y = \frac{\mu_0 I}{2\pi}\frac{x}{x^2+y^2}, \quad B_z = 0 \tag{i}$$

In the equation (i), $\mu_o$ indicates the magnetic permeability of vacuum. By adding a uniform bias magnetic field $B_{ox}$ in the positive (+) direction on the x-axis, the flux density is indicated by the following equation (ii):

$$B_x = -\frac{\mu_0 I}{2\pi}\frac{y}{x^2+y^2} + B_{0x}, \tag{ii}$$

-continued $$B_y = \frac{\mu_0 I}{2\pi}\frac{x}{x^2+y^2}, \quad B_z = 0$$

It is seen from the equation (ii) that the zero-point of the magnetic field is formed at the point $(0, \mu_0 I/(2\pi B_{0x}), 0)$ on the y-axis. The zero-point is represented by 'Q'. The distributed magnetic field lines in this condition are schematically illustrated in FIG. 1(*b*). As seen in FIG. 1(*b*), the zero-point Q of the magnetic field forms a quadrupole magnetic field. Neutral atoms can be captured at the zero-point Q on the quadrupole magnetic field and the laser cooling can be performed.

In fact, neutral atoms can be captured three dimensionally by further adding a quadrupole magnetic field in the z-direction. FIGS. 2(*a*)-2(*c*) are conceptual diagrams showing configurations for adding a quadrupole magnetic field in the z-direction and the conditions of the magnetic field. FIG. 2(*a*) shows an example in which a magnetic field is impressed from outside using, for instance, anti-Helmholtz coils in the z-direction; FIG. 2(*b*) shows an example in which a path of electric current is deformed to a U-shape by forming both ends of the coils into a U-shape; and FIG. 2(*c*) shows an example in which a path of electric current is deformed to a Z-shape by forming both ends of the coils into a Z-shape. In other words, while it is preferable that a required magnetic field is added from outside by using, for instance, anti-Helmholtz coils in the z-direction as shown in FIG. 2(*a*), in order to generate a required magnetic field in the z-direction, since a required magnetic field in the z-direction can be provided from the arm portions parallel to the x-axis, by modifying both ends of the conductor where electric current flows to a U-shape as shown in FIG. 2(*b*), this type is used more frequently than that of FIG. 2(*a*) (See e.g. non-patent document 1 below). However, in the method shown in FIG. 2(*b*), since the arm portions parallel to the x-axis also generate a bias magnetic field in the y-direction, a bias magnetic field in the y-direction has to be newly added externally in order for the compensation.

In addition, in order for a general magneto-optical trap to cool the atoms three dimensionally, laser lights are irradiated from six directions along the axis of symmetry on a magnetic field towards the central portion of the trap which is composed of a quadrupole magnetic field generated by anti-Helmholtz coils, etc. It is known, however, that magneto-optical traps composed of a linear current and a bias magnetic field include one in which a total reflection mirror for the laser lights is placed on the x-z plane, and requiring merely four leaser lights instead of six as required originally by reusing the leaser lights reflected by the total reflection mirror. Such a magneto-optical trap is called a "Surface magneto-optical trap", a "Mirror magneto-optical trap", or a "Mirror MOT", and is often used as a compact magneto-optical trap. It is to be noted that the method in which six laser lights are directly irradiated to a proximity of a conductor without using a mirror is called a "Wire trap".

A modified configuration of a linear current to a Z-shape as in FIG. 2(*c*) can generate a magnetic field with a curvature in the z-axis direction from the two arms parallel to the x-axis. Herein, "a magnetic field with a curvature in the z-axis direction" indicates a space-dependent magnetic field in which the magnitude of the magnetic field B on the z-axis is proportional to $z^2$. The magnetic field thus obtained can steadily capture neutral atoms since a confinement potential in the z-axis direction becomes a harmonic type being proportional to $z^2$. However, a magneto-optical trap cannot be composed on this magnetic field since the z component of the magnetic field faces the positive (+) direction of the z-axis everywhere in the magnetic field. Namely, a configuration with the magnetic field as described in FIG. 2(*c*) is used as a "magnetic trap" which can only capture neutral atoms without using the laser light. Generally, a magnetic trap composed by superposing a quadrupole magnetic field on the x-y plane and a magnetic field with a curvature in the z-axis direction is called a "Ioffe-Pritchard type magnetic trap", and a rod-shaped conductor which is provided in parallel to the x-y plane is called a "Ioffe bar". A magnetic trap, along with a magneto-optical trap, is an indispensable device in the field of atom optics research.

Three different types of the surface magneto-optical traps and the surface magnetic trap indicated in FIGS. 2(*a*)-2(*c*) have a commonality that they generate a quadrupole magnetic field on the x-y plane by superposing a magnetic field with a narrow linear conductor for providing electric current onto a uniform bias magnetic field form outside; and since they can capture atoms in the extreme vicinity of a plane substrate, their application possibilities, such as in an atom interferometer, a quantum gate, and the like have been attracting attention, and researches have been actively performed.

Meanwhile, as indicated in FIG. 1(*b*), a quadrupole magnetic field generated by superposing a magnetic field generated by a single narrow linear conductor onto a uniform external bias magnetic field becomes considerably asymmetrical as distanced away from the center of the trap, thereby deviating from an ideal quadrupole magnetic field. If a magneto-optical trap is composed by using such a magnetic field, there is a problem that the effective capacity in the space where atoms drifting in the vacuum are captured becomes limited, so that sufficient numbers of atoms cannot be captured.

FIG. 3 is a conceptual diagram showing the condition of a three dimensional magnetic field wherein the width of a linear conductor in FIG. 2(*b*) is enlarged in the x-direction. As shown in FIG. 3, when the width of the linear conductor shown in FIG. 2(*b*) is enlarged in the x-direction, the uniformity of the magnetic field around the conductor increases, so that the far-field magnetic profile is improved and the quadrupole reaches further away. As a result, an effective capacity where atoms can be captured is enlarged, so that a greater number of atoms can be captured (see non-patent document 2 below). However, even when such a plate conductor is used, a magnetic distortion cannot be completely compensated, and an extra electric current has to be flowed through in proportion to the widened portion of the conductor. Therefore, the amount of heat generated from a conductor part is increased. Since a magneto-optical trap and a magnetic trap are placed in an ultrahigh vacuum device, there may be a situation where gas is emitted from a surface of a conductor when the amount of heat generated is increased, which is not desirable.

Also, a configuration with a Z-shaped conductor as shown in FIG. 2(*c*) is used for composing a magnetic trap which does not use the laser light, so that a magnetic field does not have to be strictly uniformed. However, a relatively large bias magnetic field has to be applied in order to capture atoms reliably. Furthermore, since the two Ioffe bars extending in the x-direction from both ends of the central conductor are relatively long, an unnecessarily large z-directed bias magnetic field is generated, so that in order to compensate said bias magnetic field, a large z-directed bias magnetic field has to be further added from outside. Accordingly, there is a problem that the whole device cannot be miniaturized even when a magnetic trap with a Z-shaped conductor show in FIG. 2(*c*) is used.

[Non-patent document 1] J. Reichel, W. Hänsel and T. W. Hänsch, "Atomic micromanipulation with magnetic surface traps," Phys. Rev. Lett. 83, 3398 (1999).

[Non-patent document 2] S. Wildermuth, P. Krüger, C. Becker, M. Brajdic, S. Haupt, A. Kasper, R. Folman and J. Schmiedmayer, "Optimized magneto-optical trap for experiments with ultracold atoms near surfaces," Phys. Rev. A 69, 030901(R) (2004).

SUMMARY OF THE INVENTION

It is an object of the present invention to provide magneto-optical traps and/or magnetic traps which are able to provide a larger capacity for a region where neutral atoms are captured than the prior art.

It is an object of the present invention to provide magneto-optical traps and/or magnetic traps which can capture a greater number of neutral atoms than the prior art.

It is an object of the present invention to provide magneto-optical traps and/or magnetic traps which can capture neutral atoms more effectively with lesser electric current than the prior art.

It is an object of the present invention to provide magneto-optical traps and/or magnetic traps which can further reduce gas emission due to heat generation than the prior art.

It is an object of the present invention to provide magneto-optical traps and/or magnetic traps which can further miniaturize the whole device than the prior art.

The first aspect of the present invention is based upon knowledge that in a surface magneto-optical trap in which neutral atoms are captured and cooled in the proximity of a surface of a substrate by using a magnetic field generated on the surface of a substrate by applying a linear current and an externally supplied bias magnetic field as well as laser beams, a greater number of atoms can be captured in a surface magneto-optical trap by modifying a composition of a single narrow linear conductor in the prior art to that of three narrow linear conductors aligned in parallel to each other; so that a magnetic quadrupole component is reinforced while a magnetic hexapole component is effectively cancelled out, thereby obtaining a more uniform magnetic quadrupole field than the prior art, as well as enlarging the capacity of space where neutral atoms are captured.

Also, another embodiment of a neutral atom trapping device according to the first aspect of the present invention is based upon knowledge that the same effect can be expected by adding an additional linear conductor above the capturing region.

The second aspect of the present invention is based upon knowledge that in a surface magneto-optical trap in which neutral atoms around the surface of a substrate are captured using a magnetic field composed of a Z-shaped conductor on the surface of a substrate and a bias magnetic field supplied from outside, by further bending Ioffe bars of Z-shaped conductor in a right angle to form an S-shaped structure, a bias magnetic field component generation in the z-direction can be reduced, the curvature at a z-directed magnetic field can be increased, a bias magnetic field in the x-direction can be enhanced, thereby obtaining ability to acquire the same atom capturing capability as that of the neutral atoms can be captured with lesser electric current than the prior art.

The present invention is based upon knowledge in which the whole device can be further miniaturized than the prior art by adopting all of the above configurations. Specifically, by combining a configuration adopting three linear conductors (or a linear conductor added above the capturing region) and a configuration adopting an S-shaped Ioffe bar, the capability of effectively capturing neutral atoms with less electric current is enhanced, thereby a whole device is miniaturized.

A neutral atom trapping device according to the first aspect of the present invention is basically provided with a multipole-magnetic field-generating electrode which includes; an electrode for main current where a main current flows, and a pair of sub-current electrodes, where a sub-current flows, located in parallel to both sides of said electrode for main current. As shown in FIG. 6 and in examples which will be later described theoretically, said sub-current electrodes function to enhance a magnetic quadrupole component while attenuating a magnetic hexapole component in the region where neutral atoms are captured. "The region where neutral atoms are captured" means a region where neutral atoms can be captured in a neutral atom trapping device such as a magneto-optical trapping device, a magnetic trapping device, or the like and is a region including the zero-point Q as will be described below.

A preferred embodiment of a neutral atom trapping device according to the first aspect of the present invention is any one of the above-mentioned neutral atom trapping devices, wherein each of said main current electrode and said pair of sub-current electrodes includes a linear portion. It is preferable that said linear portions are parallel to each other, and preferably three linear portions exist on the x-z plane. Moreover, said main current electrode and said pair of sub-current electrodes preferably include a linear portion around the vicinity where neutral atoms are captured. By using the multipole-magnetic field-generating electrodes with such an embodiment, a magnetic field where neutral atoms can be effectively captured can be formed.

A preferred embodiment of a neutral atom trapping device according to the first aspect of the present invention is any one of the above-mentioned neutral atom trapping devices, wherein each of said main current electrode and said pair of sub-current electrodes includes a linear portion, and the linear portion in said main current electrode and the linear portion in said pair of sub-current electrodes are electrically interconnected with connecting portions which extend in a vertical direction to the electrodes. By using the electrodes according to such an embodiment, it can be utilized as an S-shaped electrode which will be later described, so that neutral atoms can be effectively captured and the whole device can be miniaturized.

A preferred embodiment of a neutral atom trapping device according to the first aspect of the present invention is any one of the above-mentioned neutral atom trapping devices, wherein each of said main current electrode and said pair of sub-current electrodes includes a linear portion; the linear portion in said main current electrode and the linear portion in said pair of sub-current electrodes are electrically interconnected with connecting portions which extend in a vertical direction to the electrodes; positions where said two connecting portions and said main current electrode intersect are set on opposite sides of a position of said main current electrode corresponding to a central position where the neutral atoms are captured. By using the electrodes according to such an embodiment, it can be utilized as an S-shaped electrode which will be later described, so that neutral atoms can be effectively captured and the whole device can be miniaturized.

A preferred embodiment of a neutral atom trapping device according to the first aspect of the present invention is any one of the above-mentioned neutral atom trapping devices, wherein one or more of said main current electrode and said pair of sub-current electrodes include: a linear portion; and portions bending downwards (in a negative direction of the y-axis) at one or both ends of said linear portion. Having the portions bending downwards, it is made possible to enhance an x-directed bias magnetic field at the vicinity of the zero point, so that an external magnetic field can be reduced, and it is consequently made possible to reduce applied current for a device while miniaturizing the whole device.

A preferred embodiment of a neutral atom trapping device according to the first aspect of the present invention is any one of the above-mentioned neutral atom trapping devices, wherein one or more of the said main current electrode and said pair of sub-current electrodes include: a linear portion; and a U-shaped portion having a linear portion and bending portions at both ends of said linear portion. Such U-shaped portions are provided on the x-z plane, and one including two linear portions parallel to the x-axis and a linear portion parallel to the z-axis while connected to said portions parallel to the x-axis can be mentioned. Since it includes such electrode portions, a z-directed magnetic field can be enhanced by a magnetic field generated by the portions parallel to the x-axis, so that an external magnetic field is reduced, and it is consequently made possible to reduce applied current for a device while miniaturizing the whole device.

A preferred embodiment of a neutral atom trapping device according to the first aspect of the present invention is any one of the above-mentioned neutral atom trapping devices having an optical beam generating portion for irradiating optical beams into a multipole magnetic field generated by said multipole-magnetic field-generating electrode. Having an optical beam generating portion, the neutral atom trapping device can function as so-called "magneto-optical trap". It is to be noted that publicly-known elements in magneto-optical traps and magnetic traps can be appropriately adopted for the neutral atom trapping device of the present invention. The neutral atom trapping devices themselves are publicly-known, and may appropriately include: vacuum pumps for vacuum device, a vacuum chamber with electrode storage capacity, an atom-beam generating portion which generates neutral atoms, a magnetic field generating portion (electrode) for applying various magnetic fields, mirrors, detectors, and the like. When the neutral atom trapping device of the present invention is used to deposit neutral atoms on samples, a sample stand for loading samples, a control device for controlling the position of a sample stand, an electric field generating device for controlling directions of atom beams, a magnetic field generating device for controlling directions of atom beams, a light source for controlling directions of atom beams, and the like may be appropriately included.

A preferred embodiment of a neutral atom trapping device according to the first aspect of the present invention is any one of the above-mentioned neutral atom trapping devices which is provided with: an optical beam generating portion for irradiating optical beams from four directions along a symmetric axis of a magnetic quadrupole component into a multi-pole magnetic field generated by said multipole-magnetic field-generating electrode; and a total reflection mirror; and which functions as a surface magneto-optical trap.

A preferred embodiment of a neutral atom trapping device according to the first aspect of the present invention is any one of the above-mentioned neutral atom trapping devices which has an optical beam generating portion for irradiating optical beams from six directions along a symmetric axis of a magnetic quadrupole component into a multipole magnetic field generated by said multipole-magnetic field-generating electrode without having a total reflection mirror.

A preferred embodiment of a neutral atom trapping device according to the first aspect of the present invention is provided with: a multipole-magnetic field-generating electrode which includes; a main current electrode where a main current flows; and a sub-current electrode which is provided on an opposite side of said main current electrode through a region where neutral atoms are captured and which includes a linear portion where a sub-current flows. The neutral atom trapping device of this embodiment also functions in the same way as described above, so that the sub-current electrode enhances the magnetic quadrupole component while attenuating a magnetic hexapole component. It is to be noted that the neutral atom trapping device according to this embodiment can appropriately adopt each arrangement mentioned above. A more preferred embodiment of a neutral atom trapping device according to this embodiment is a neutral atom trapping device, wherein said sub-current electrode includes a linear portion which is provided above said main current electrode through a region where neutral atoms are captured, curved portions extending downwards from both ends of said linear portion; and a linear portion extending downwards from said curved portions. More specifically, it is any one of the above-mentioned neutral atom trapping devices, wherein said sub-current electrode includes: a linear portion which is provided above said main current electrode through a region where neutral atoms are captured; semicircular portions extending downwards from both sides of said linear portion; and linear portions extending downwards from bottom ends of said semicircular portions. Such a curved portion and a semicircular portion contribute(s) to generating a z-directed magnetic field besides effectively detouring a laser light. Furthermore, the portion extending downwards contributes towards generating an x-directed magnetic field. Thus, since an external magnetic field can be reduced, the whole device can be miniaturized besides reducing current applied to the device.

A neutral atom trapping device according to the second aspect of the present invention is provided with: when a point of origin is set at a point below a central region where neutral atoms are captured, a z-axis is set to a direction of the linear portion of a multipole-magnetic field-generating electrode near a center where said neutral atoms are captured and a center where the neutral atoms are captured is provided on the y-axis, said multipole-magnetic field-generating electrode includes; a linear portion extending along the z-axis through said point of origin; a portion extending in a direction parallel to the x-axis from said linear portion; and a portion parallel to the z-axis extending from the two portions extending in a direction parallel to the x-axis. As described above, by forming an S-shaped structure by further bending the Ioffe bar of a Z-shaped conductor in right angle, generation of a z-directed bias magnetic field component can be reduced while reinforcing the curvature in a z-directed magnetic field, as well as reinforcing an x-directed bias magnetic field. As a result, it is made possible to obtain the same degree of ability to capture neutral atoms with lesser electric current than the prior art.

According to the present invention, magneto-optical traps and/or magnetic traps which are able to provide a larger capacity for a region where neutral atoms are captured than the prior art can be provided. Therefore, according to the present invention, magneto-optical traps and/or magnetic traps which can capture a greater number of neutral atoms than the prior art can be provided.

According to the present invention, it can provide magneto-optical traps and/or magnetic traps which can capture neutral atoms more effectively with lesser electric current than the prior art can be provided. Therefore, according to the present invention, magneto-optical traps and/or magnetic traps in which can further reduce gas emission due to heat generation than the prior art can be provided.

According to the present invention, magneto-optical traps and/or magnetic traps which can further miniaturize the whole device than the prior art can be provided.

BRIEF DESCRIPTION OF THE DRAWINGS

FIG. 1(*a*) is a drawing showing a condition of a magnetic field wherein an infinitely-long linear current (I) flows along the z-axis, while FIG. 1(*b*) is a drawing showing the condition of a magnetic field wherein an uniform bias magnetic field is further applied in the positive (+) direction on the x-axis.

FIG. 2(*a*) shows an example in which a magnetic field is applied towards the z-axis from outside using, for instance, anti-Helmholtz coils. FIG. 2(*b*) shows an example in which a path of electric current is deformed to a U-shape by forming both ends of the linear conductor into a U-shape. FIG. 2(*c*) shows an example in which a path of electric current is deformed to a Z-shape by forming both ends of the linear conductor into a Z-shape.

FIG. 5(*a*) shows the condition of a dipole magnetic field; FIG. 5(*b*) shows that of a quadrupole magnetic field, FIG. 5(*c*) shows that of a hexapole magnetic field.

FIG. 11(*a*) shows a magnetic field generated by the main current $I_1$ alone, FIG. 11(*b*) shows the condition of the two-dimensional magnetic-field structure generated by completely canceling the hexapole magnetic field using the main electric current $I_1$ together with the subsidiary electric current $I_2$.

DETAILED DESCRIPTION OF THE PREFERRED EMBODIMENTS

Figure 4:
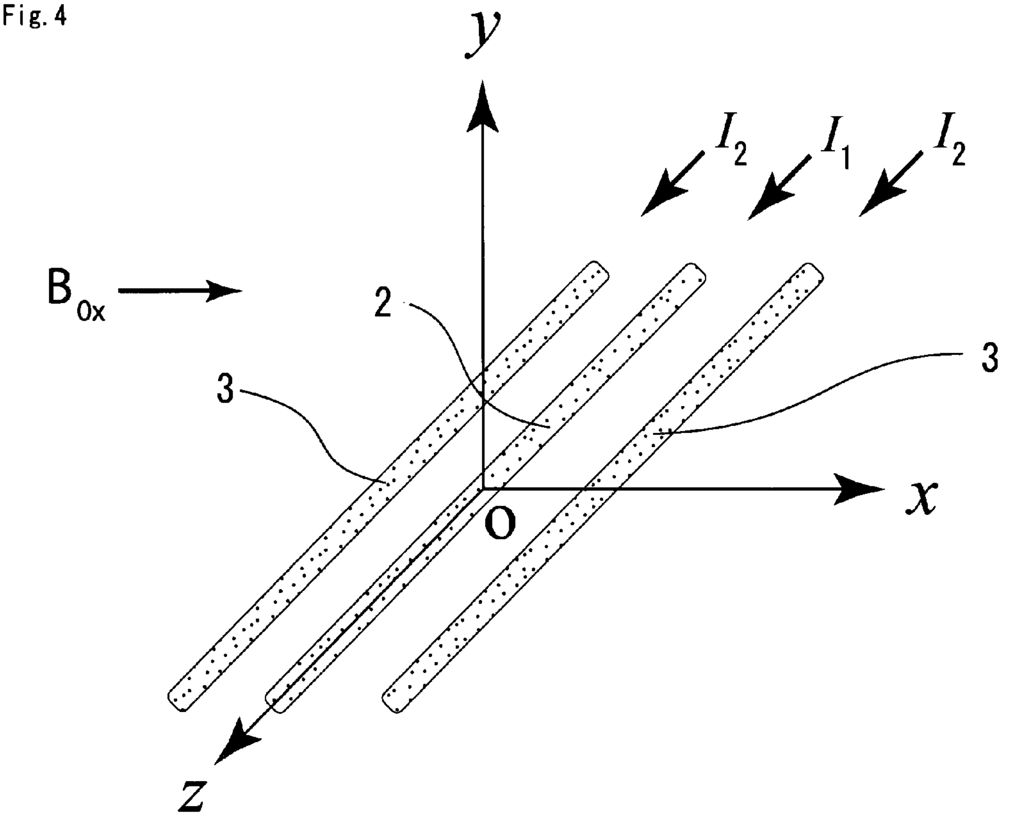
FIG. 4 is a pattern diagram illustrating the principle of a neutral atom trapping device according to the first aspect of the present invention.

Configuration in which Sub-Currents are Placed on Both Sides of Main Current FIG. 4 is a pattern diagram illustrating the principle of a neutral atom trapping device according to the first aspect of the present invention. '2' in FIG. 4 represents a main current electrode while '3' represents sub-current electrodes. As shown in FIG. 4, a neutral atom trapping device according to the first aspect of the present invention can obtain a more uniform quadrupole magnetic field than the prior art modifying a composition of a single narrow linear conductor in the prior art to that of three narrow linear conductors aligned in parallel to each other; thereby reinforcing a magnetic quadrupole component while effectively canceling out a magnetic hexapole component; as a result obtaining a more uniform magnetic quadrupole field than prior art.

A neutral atom trapping device according to the first aspect of the present invention is basically provided with: a multipole-magnetic field-generating electrode with a main current electrode (2), and a pair of sub-current electrodes (3) through which the sub-current flows, and which is located in parallel to and both sides of said main current electrode. As will be described theoretically in the execution example later, said sub-current electrodes function to enhance a magnetic quadrupole component while attenuating a magnetic hexapole component in the region where neutral atoms are captured. "The region where neutral atoms are captured" means a region where neutral atoms are to be captured in a magneto-optical trap and/or a magnetic trapping device such as a region comprising the zero-point Q as explained below. The parameters for the region where neutral atoms are captured are set at, for instance, 1 mm-10 cm above the main current electrode, or preferably at 1 mm-1 cm, or more preferably at 2 mm-1 cm.

As materials used for each electrode, metals, metallic oxides, conductors, superconductors, or the like can be used appropriately. As for the materials which can be used under normal temperature—from the standpoint of reducing heat generation, since the electric resistance is desirably as small as possible, metal materials with the electric resistance of the order of $10^{-8}$ Ωm, (specifically at $1\times10^{-8}$ Ωm-$1\times10^{-7}$ Ωm), such as gold, silver, copper, aluminum, and the like are preferred. However, a region where transparency to laser beams is especially of importance, a transparent conducting oxide such as ITO with the electric resistance value of the order of $10^{-6}$ Ωm (specifically $1\times10^{-6}$ Ωm-$1\times10^{-5}$ Ωm) can also be used. "A region where transparency to laser beams is especially of importance" means, for instance, a part where the optical laser passes through and/or an electrode part which is located near the region where the optical laser passes through. Specifically, in the case there is a circumstance in which an electrode for sub-current is placed above the trapping region of neutral atoms; then, there is a circumstance in which an electrode for sub-current is designed as a transparent electrode. In addition, a superconductor can be used in the case there is a circumstance in which a vacuum device comprises a structure enabling to cool below the temperature of liquid nitrogen. However, in general, since there is an upper limit value in an electric current which can be applied to a superconductor, it is not always the case that superconductors are preferred.

As for the magnitude of a quadrupole magnetic field for capturing/cooling neutral atoms, it ranges: $1\times10^0$ G/cm~$1\times10^3$ G/cm, and it can also be $1\times10^0$ G/cm~$1\times10^2$ G/cm, or $5\times10^0$ G/cm~$5\times10^2$ G/cm. For example, in the case of the magnitude of a quadrupole magnetic field in a MOT for rubidium atoms, $5\times10^0$ G/cm~$5\times10^2$ G/cm can be mentioned, where specifically approximately 10 G/cm can be mentioned.

Accordingly, when the trapping region of neutral atoms is formed several millimeters away from the main current electrode, 5-10 A can be mentioned as the value of the main current, and 10-20 A can be mentioned as the value of each of the pair of sub-currents. Also, given that the value of a main current is set as $I_1$ and that of a sub-current as $I_2$, then 1-3 can be mentioned as the value of $I_2/I_1$, or it may be 1.5-2.5, it may be 3.5-4.5, preferably 3.5-4.0. Thus, the sub-current is preferably larger than the main current, while directions of both of the main current and the sub-current may be the same or opposite, as will be described later in theoretical calculations, the same direction is preferable. The length of both electrodes for main and sub-current can adopt the publicly-known length in a MOT.

A preferred embodiment of a neutral atom trapping device according to the first aspect of the present invention is any one of the above-mentioned neutral atom trapping devices, wherein a linear portion is provided in both said main current electrode and said pair of sub-current electrodes. While it is preferable that the linear portion is as lengthy as possible, it is preferable that at least there is a linear portion in the entire region where neutral atoms are captured. In addition, it is preferable that said linear portions are parallel to each other, and preferably the three linear portions exist on the x-z plane. Moreover, said main current electrode and said pair of sub-current electrodes are preferably provided with a linear portion around the vicinity where neutral atoms are captured. By utilizing a multipole-magnetic field-generating electrode according to such an embodiment, it is made possible to generate a magnetic field where neutral atoms can be effectively captured. It is to be noted that according to the specification of the present invention, the vicinity of trapping region where neutral atoms are captured, the coordinates are so established that the direction to which a main current flows is set as the direction of the z-axis while the central portion of the trapping region where neutral atoms are captured is set at a point on the y-axis.

Figure 8:
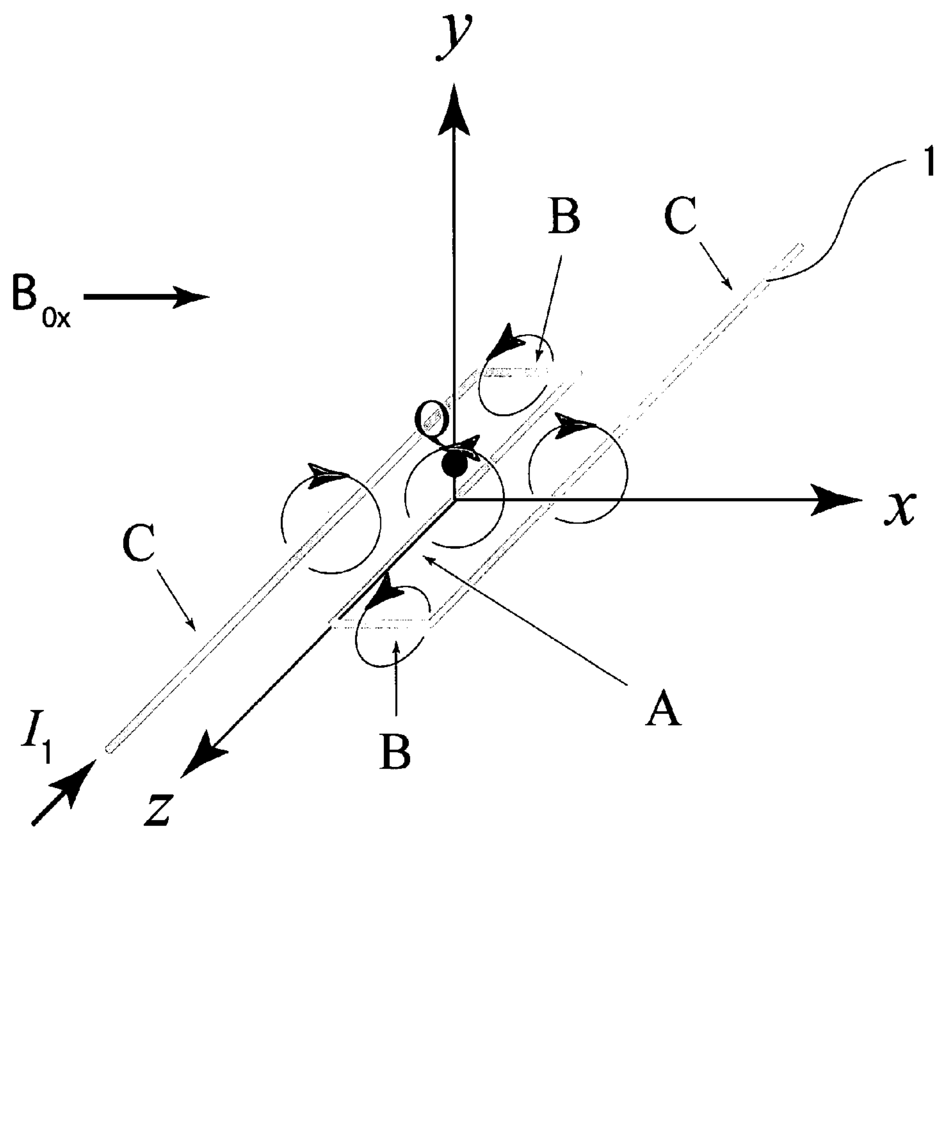
FIG. 8 is a conceptual diagram showing a new conductor in which both arms (the Ioffe bars) extending towards the x-axis, which is used often for surface magnetic traps in a conventional Z-shape conductor, are bent in the z-direction.
Figure 9:
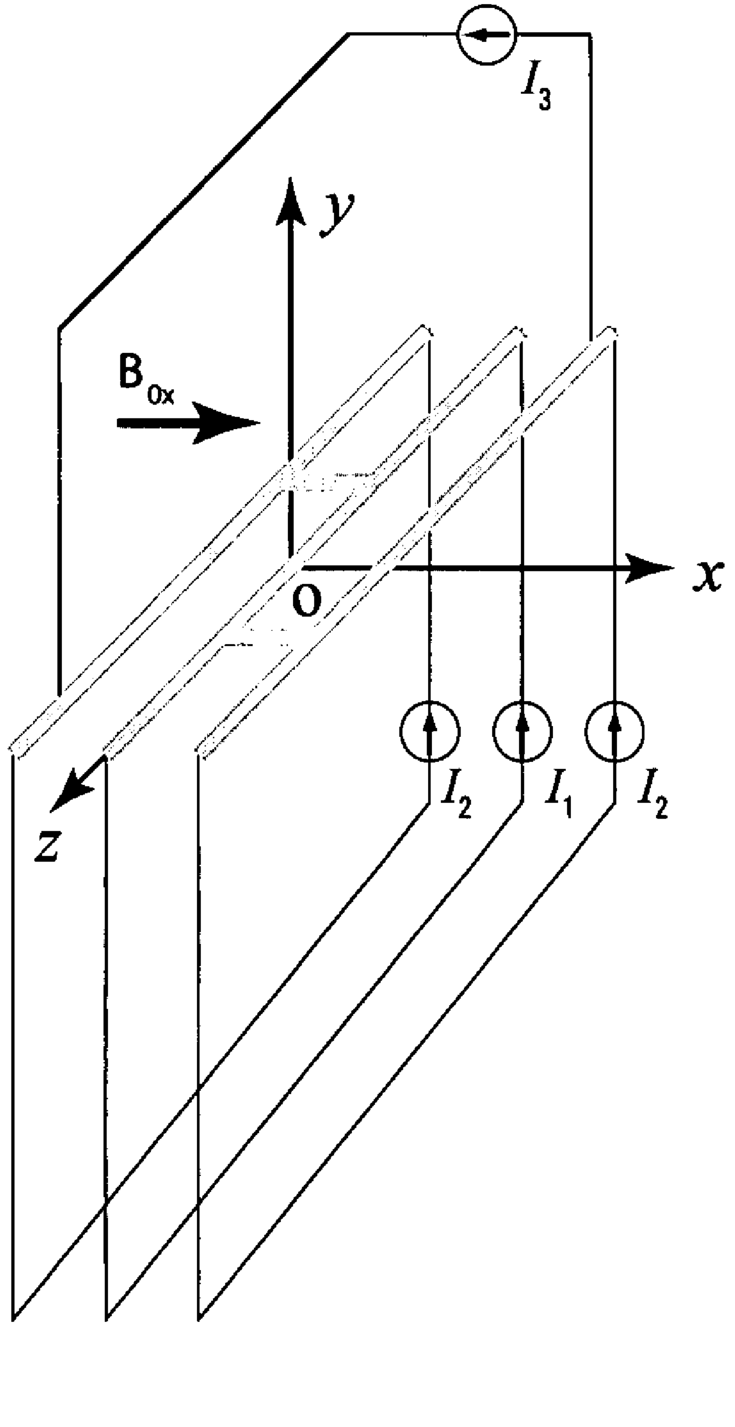
FIG. 9 is a conceptual diagram showing an example in which a pair of sub-current electrodes (conductor) flowing through $I_2$ in the first aspect of the present invention of a neutral atom device also serves as Part C in the second aspect of the present invention of a neutral atom device.

A preferred embodiment of a neutral atom trapping device according to the first aspect of the present invention is any one of the above-mentioned neutral atom trapping devices, wherein: each of said main current electrode and said pair of sub-current electrodes has a linear portion; and the linear portions of both said main current electrode and said pair of sub-current electrodes are electrically connected at the connecting portions which extend in the vertical direction to the electrodes. By using the electrode according to such an embodiment, since it can also be used as the later described S-shaped electrode as shown in FIGS. 8 and 9, it can capture neutral atoms effectively and also miniaturize the whole device.

A preferred embodiment of a neutral atom trapping device according to the first aspect of the present invention is any one of the above-mentioned neutral atom trapping devices, wherein each of said main current electrode and said pair of sub-current electrodes includes a linear portion; the linear portion in said main current electrode and the linear portion in said pair of sub-current electrodes are electrically interconnected with connecting portions which extend in a vertical direction to the electrodes; positions where said two connecting portions and said main current electrode intersect are set on opposite sides of a position of said main current electrode corresponding to a central position where the neutral atoms are captured. By using an electrode according to such an embodiment, it can be utilized as an S-shaped electrode which will be later described, so that neutral atoms can be effectively captured and the whole device can be miniaturized.

A preferred embodiment of a neutral atom trapping device according to the first aspect of the present invention is any one of the above-mentioned neutral atom trapping devices, wherein one or more of said main current electrode and said pair of sub-current electrodes include: a linear portion; and portions bending downwards (in a negative direction of the y-axis) at one or both ends of said linear portion. Specifically, one shown in FIG. 9 can be mentioned. Having the portions bending downwards, it is made possible to enhance an x-directed bias magnetic field at the vicinity of the zero point, so that an external magnetic field can be reduced, and it is consequently made possible to reduce applied current for a device while miniaturizing the whole device.

A preferred embodiment of a neutral atom trapping device according to the first aspect of the present invention is any one of the above-mentioned neutral atom trapping devices, wherein one or more of the said main current electrode and said pair of sub-current electrodes include: a linear portion; and a U-shaped portion having a linear portion and bending portions at both ends of said linear portion. Such U-shaped portions are provided on the x-z plane, and one including two linear portions parallel to the x-axis and a linear portion parallel to the z-axis while connected to said portions parallel to the x-axis can be mentioned. Since it includes such electrode portions, a z-directed magnetic field can be enhanced by a magnetic field generated by the portions parallel to the x-axis, so that an external magnetic field is reduced, and it is consequently made possible to reduce applied current for a device while miniaturizing the whole device.

A preferred embodiment of a neutral atom trapping device according to the first aspect of the present invention is any one of the above-mentioned neutral atom trapping devices having an optical beam generating portion for irradiating optical beams into a multipole magnetic field generated by said multipole-magnetic field-generating electrode. Having an optical beam generating portion, the neutral atom trapping device can function as so-called “magneto-optical trap”. While a wavelength within a range between visible and near infrared, for example, can be appropriately used as a wavelength of the light composing the light beam, the absorbed wavelength of light depends on the type of the neutral atom to be captured, so that appropriate wavelength may be used according to the neutral atom to be captured. For example, light with wavelength of 780 nm or 795 nm may be used when rubidium atoms are to be captured, and light with wavelength of 852 nm or 894 nm may be used when cesium atoms are to be captured.

Publicly-known elements in magneto-optical traps and magnetic traps can be appropriately adopted for the neutral atom trapping device of the present invention. The neutral atom trapping devices themselves are publicly-known, and may appropriately include: vacuum pumps for vacuum device, a vacuum chamber with electrode storage capacity, an atom-beam generating portion generating neutral atoms, a magnetic field generating portion (electrode) for applying various magnetic fields, mirrors, detectors, and the like. When the neutral atom trapping device of the present invention is used to deposit neutral atoms on samples, a sample stand for loading samples, a control device for controlling the position of a sample stand, an electric field generation device for controlling directions of atom beams, a magnetic field generating device for controlling directions of atom beams, a light source for controlling directions of atom beams, and the like may be appropriately included.

A preferred embodiment of a neutral atom trapping device according to the first aspect of the present invention is any one of the above-mentioned neutral atom trapping devices which is provided with: an optical beam generating portion for irradiating optical beams from four directions along a symmetric axis of a magnetic quadrupole component into a multipole magnetic field generated by said multipole-magnetic field-generating electrode; and a total reflection mirror; and which functions as a surface magneto-optical trap.

A preferred embodiment of a neutral atom trapping device according to the first aspect of the present invention is any one of the above-mentioned neutral atom trapping devices which has an optical beam generating portion for irradiating optical beams from six directions along a symmetric axis of a magnetic quadrupole component into a multi-pole magnetic field generated by said multi-pole magnetic field generating electrode without having a total reflection mirror. Hereinafter, how the above-mentioned effect can be achieved with the above-mentioned arrangement will be described.

Figure 1:
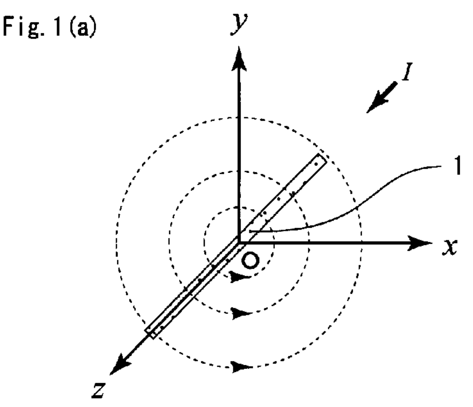
FIGS. 1(*a*) and 1(*b*) are conceptual diagrams showing a relationship between an electric current and a magnetic field.
Figure 1:
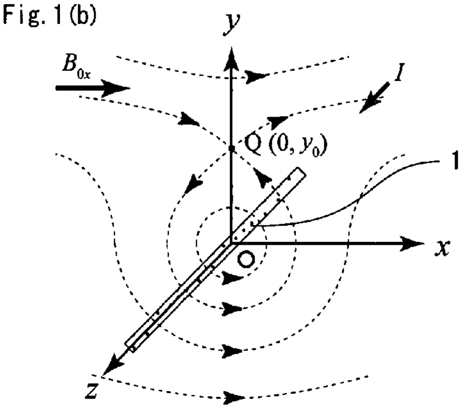

A magnetic field on the x-y plane generated by an electric current flowing through a single central conductor can be approximated by a quadrupole magnetic field at the vicinity of the trap center Q $(0, y_0)$ as shown in FIG. 1(*b*). However, as the distance from the trap center increases, it deviates from the quadrupole. It is easy to understand the behavior of this magnetic field by considering that higher order multi-pole magnetic fields are superposed with one another at the trap center.

Figure 5A:
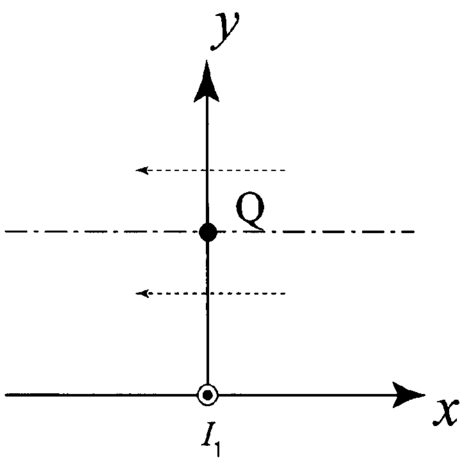
In FIGS. 5(*a*)-5(*c*), a magnetic field (FIG. 1(*a*)) formed by a single linear current $I_1$ near the trap center (the zero point Q) is expanded into multipoles, in which magnetic multipole components of dipole, quadrupole and hexapole are schematically illustrated.
Figure 5B:
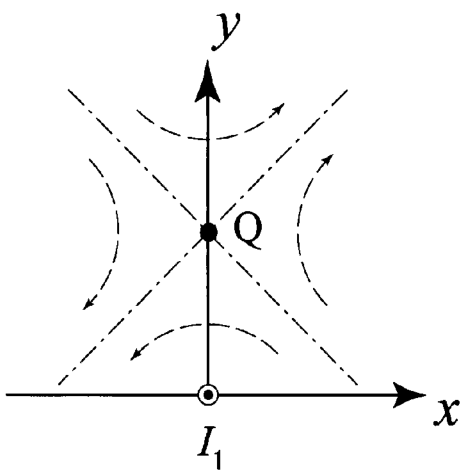
Figure 5C:
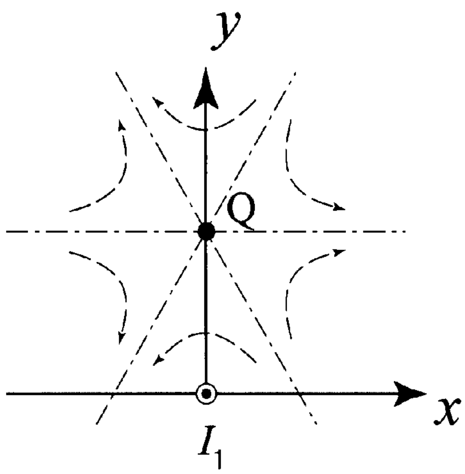

Hereinafter, phenomena in two dimensions will be described in order to intelligibly explain the characteristics of the invention. FIGS. 5(*a*)-5(*c*) schematically illustrate, a magnetic field (FIG. 1(*a*)) formed by a single linear current $I_1$ near the trap center (the zero point Q) to which a multipole expansion is performed to show magnetic multipole components of dipole, quadrupole and hexapole thereof. FIG. 5(*a*) shows the condition of a dipole magnetic field, FIG. 5(*b*) shows that of a quadrupole magnetic field, and FIG. 5(*c*) shows that of a hexapole magnetic field. In FIGS. 5(*a*)-5(*c*), typical magnetic field lines are indicated by arrows and the axis of symmetry on a magnetic field is shown by double-dash-lines. Higher order multipoles beyond octapoles can also be analogized in the same way as in FIG. 5(*a*)-FIG. 5(*c*). The magnetic field shown in FIG. 1(*a*) can be expressed as an overlapping of all of those multipoles. The contribution of each component around the zero point Q decreases in order of dipole, quadrupole and hexapole respectively, and by adding a certain x-directed uniform bias magnetic field from outside, a dipole component gets cancelled out so that a quadrupole component appears most remarkably. Such a situation is the magnetic field shown in FIG. 1(*b*). The ideal quadrupole magnetic field shown in FIG. 5(*b*) is desirable in order to form a magneto-optical trap. However, as shown in FIG. 1(*b*) the far the magnetic field draws apart from the point Q, the more it deviates from the ideal quadrupole component field due to the contribution of higher-order multipoles beyond hexapoles.

On the one hand, in the magnetic field shown in FIG. 1(*a*) and/or (*b*), for the exception of the extreme vicinity of electric current, the actual far-field profile of a magnetic field is relatively simple. Thus, it is clear that the higher the order of multi poles, the smaller the contribution to the far-field profile of higher order multi-poles. Therefore, it is sufficient to pay attention to the component with relatively lower poles among the higher order multi-poles, such as that of hexapole or, at most, octapole; especially that of hexapole is most important. Therefore, it is conceived that the form of the magnetic field near the trap center Q is to be improved by selectively eliminating the component of the hexapole magnetic field generated near the trap center Q.

Figure 6:
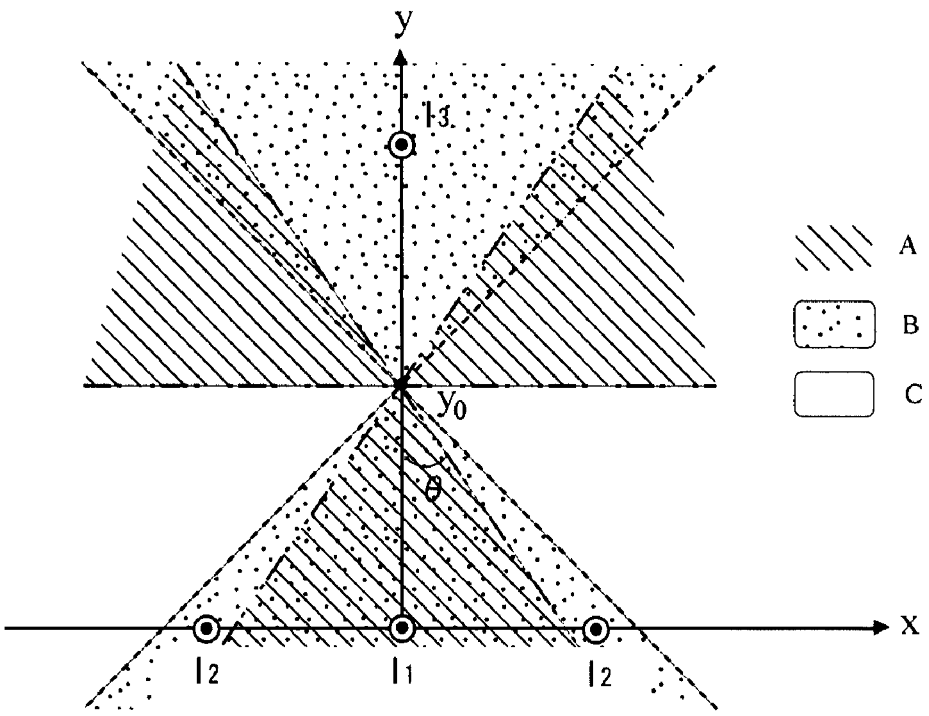
FIG. 6 schematically represents an overlapping view of the quadrupole magnetic field with the hexapole magnetic field generated around the trap center Q (0, y0) by electric current $I_1$ flowing through the central conductor.

A procedure of eliminating a hexapole component is as follows: FIG. 6 schematically represents an overlapping view of the quadrupole magnetic field with the hexapole magnetic field generated around the trap center Q (0, $y_0$) by electric current $I_1$ flowing through the central conductor. In the drawing, the hatched portion (region A) represents a region where the hexapole magnetic field lines are turning clockwise with respect to Q and the painted portion (region B) represents a region where the quadrupole field lines are turning clockwise with respect to Q. The white background (region C) represents a region in which the magnetic field lines for both quadrupole and hexapole are turning counter-clockwise with respect to Q. Provided with the angle θ (deg) as shown in FIG. 6, for instance, the magnetic field lines for both quadrupole and hexapole are turning clockwise in the region of $-30°<\theta<30°$, and in the region of $30°<\theta<45°$, the magnetic field lines for quadrupole are turning clockwise while that of the hexapole are turning counter-clockwise.

If the linear current is in the direction other than $\theta=0°$, it has only to consider that the whole region A or B is rotated by θ in accordance with the above direction. When rotated by $\theta=\pm 90°$, the direction of the magnetic field lines in the region B and the other regions besides B exchanges, and when superposed on the original quadrupole magnetic field, they cancel each other out completely; so that the quadrupole disappears. In addition, the hexapole rotates reversely when rotated at $\theta=\pm 60°$, and they cancel each other out and disappear when superposed with the original hexapole.

Here, in addition to the electric current $I_1$ flowing through the central conductor, it is considered that a pair of linear currents $I_2$ is added on the x-axis (i.e., three dimensionally in parallel to the z-axis on the x-z plane). FIG. 4 describes the condition in which three linear conductors in parallel to the z-axis are set on the x-z plane in parallel to each other at equal intervals. Although the direct current with the positive direction on the z-axis is provided to the three conductors, it is supposed that different electric currents $I_1$ and $I_2$ can be respectively provided to the central conductor and a pair of the conductors set on both sides. When a total reflection mirror is located on the x-z plane, since the conductors are placed within or below the x-z plane, there is to be no concern that the optical lasers be blocked, thus it is favorable for composing a surface magneto-optical trap. When $I_2$ is placed on the region at $-30°<\theta<30°$, both the quadrupole and the hexapole are strengthened, when $I_2$ is placed on the region at $30°<\theta<45°$ or at $-30°<\theta<-45°$ as shown in FIG. 6, the quadrupole is enhanced while the hexapole counteracts and gets weakened. Therefore, by selectively choosing the magnitude/strength of $I_1$ and $I_2$, the hexapole can be completely eliminated. Although it is not drawn in FIG. 6, the effect of canceling out the octapole can also be obtained in the region at $30°<\theta<45°$ or at $-30°<\theta<-45°$. According to the detailed calculation, although it is known that both the hexapole and the octapole can be completely eliminated simultaneously at $\theta=\pm 45°$, the quadrupole cannot be strengthened under this condition; therefore, it is preferable that the θ is set to be within ±45°.

Since the previous method using the planar conductor is to flow electric current even at the region at $-30°<\theta<30°$, both the quadrupole and the hexapole are enhanced. And in order to cancel out the enhanced hexapole, the width of the central conductor needs to be widened so that it broadly projects towards the region at $\theta>30°$; accordingly, there arises the necessity for providing more electric current. On the one hand, a neutral atom trapping device relating to the first aspect of the present invention is able to selectively strengthen the quadrupole while attenuating the hexapole; as a result, it is enabled to obtain the same effect as compared to the prior art while using less electric current.

As an actual implementation, the three conductors cannot be made infinitely long, so that having to be vertically bent downwards (to the negative direction on the y-axis) at a certain length; and they are considered to be connected to the external part of the electric current sources via a feed-through for ultrahigh vacuum. In this case, since the x-directed bias magnetic field near the point Q is enhanced by electric current at the vertically bent portions on the ends of the conductors, it is enabled to weaken the current value required for generating a bias magnetic field.

When the wiring as shown in FIG. 4 is used, it is preferable that an inhomogeneous magnetic field is added from outside towards the z-axis in order to capture neutral atoms three dimensionally. However, it is possible to omit adding a z-directed magnetic field from outside by modifying one or more of the three conductors into a U-shape thereby resembling the similar structure as in FIG. 2(*b*).

In addition, as it is possible to adjust the each provided electric current independently, for instance, by placing multiple electric currents on the x-z plane with inconstant or constant intervals, or by arranging them on a cylindrical surface with the zero-point Q as its center; as a result, an electric wiring, which enables to cancel out specified arbitral multi-poles or to strengthen only the specified multi-poles, can be obtained via numerical calculation by using, for instance, a pattern-matching method. However, when mounting as a neutral-atom trapping device—since it is ideal that the structure be as simple as possible while obtaining the greatest effect—merely using the three conductors, as mentioned above, may be a realistic mounting pattern.

[A Configuration to Make Sub-Current onto a Capturing Region]

A preferred embodiment of a neutral atom trapping device according to the first aspect of the present invention is provided with: a multipole-magnetic field-generating electrode which includes; a main current electrode where a main current flows; and a sub-current electrode which is provided on an opposite side of said main current electrode through a region where neutral atoms are captured and which includes a linear portion where a sub-current flows. The neutral atom trapping device of this embodiment also functions in the same way as described above, so that the sub-current electrode enhances the magnetic quadrupole component while attenuating a magnetic hexapole component. It is to be noted that the neutral atom trapping device according to this embodiment can appropriately adopt each arrangement mentioned above. A more preferred embodiment of a neutral atom trapping device according to this embodiment is a neutral atom trapping device, wherein said sub-current electrode includes a linear portion which is provided above said main current electrode through a region where neutral atoms are captured, curved portions extending downwards from both ends of said linear portion; and a linear portion extending downwards from said curved portions. More specifically, it is any one of the above-mentioned neutral atom trapping devices, wherein said sub-current electrode includes: a linear portion which is provided above said main current electrode through a region where neutral atoms are captured; semicircular portions extending downwards from both sides of said linear portion; and linear portions extending downwards from bottom ends of said semicircular portions. Such a curved portion and semicircular portion contribute(s) to generating a z-directed magnetic field besides effectively detouring a laser light. Furthermore, the portion extending downwards contributes towards generating an x-directed magnetic field. Thus, since an external magnetic field can be reduced, the whole device can be miniaturized besides reducing current impressed to the device.

The electrode portion with this aspect is shown in FIG. 6. That is, besides placing the main current electrode ($I_1$), placing the linear sub-current electrodes in the direction at $\theta=180°$, as shown in FIG. 6, $I_3$, also enables to obtain the effect in which the quadrupole is enhanced while the hexapole is attenuated. In this case, although the octapole magnetic field gets strengthened, a magnetic field generated by $I_3$ also has the effect of enhancing an x-directed bias magnetic field, hence convenient depending upon intended purposes. For instance, by using $I_3$, since the x-directed bias magnetic field from outside is to be no longer necessary (i.e., the bias magnetic field can be provided automatically), it is suitable for miniaturizing a neutral atom trapping device. When laser beams are propagated from above, there might be a situation in which a conductor blocks a portion of laser beams. However, when composing a surface magneto-optical trap, it will not be a problem since there is no need to propagate laser beams vertically from above. Further, a trapping device for neutral atom trap relating to this aspect, can have a pair of the sub-current electrodes as indicated in $I_2$ but usually it is not required as explained above. The principle of the configuration, in which the sub-current is placed above the trapping region, is explained below.

Figure 2A:
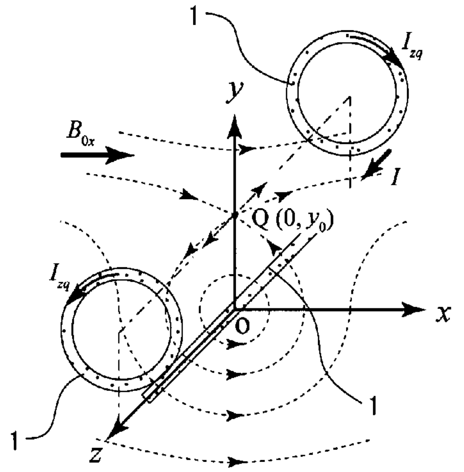
FIGS. 2(*a*)-2(*c*) are conceptual diagrams showing a configuration in order to add a quadrupole magnetic field in the z-direction and the condition of the magnetic field.
Figure 2B:
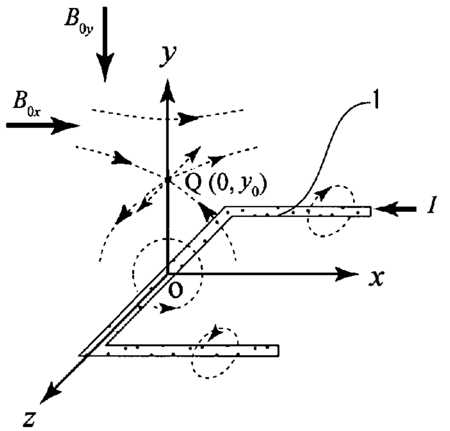
Figure 2C:
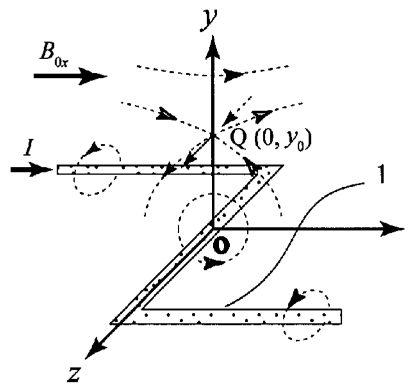
Figure 3:
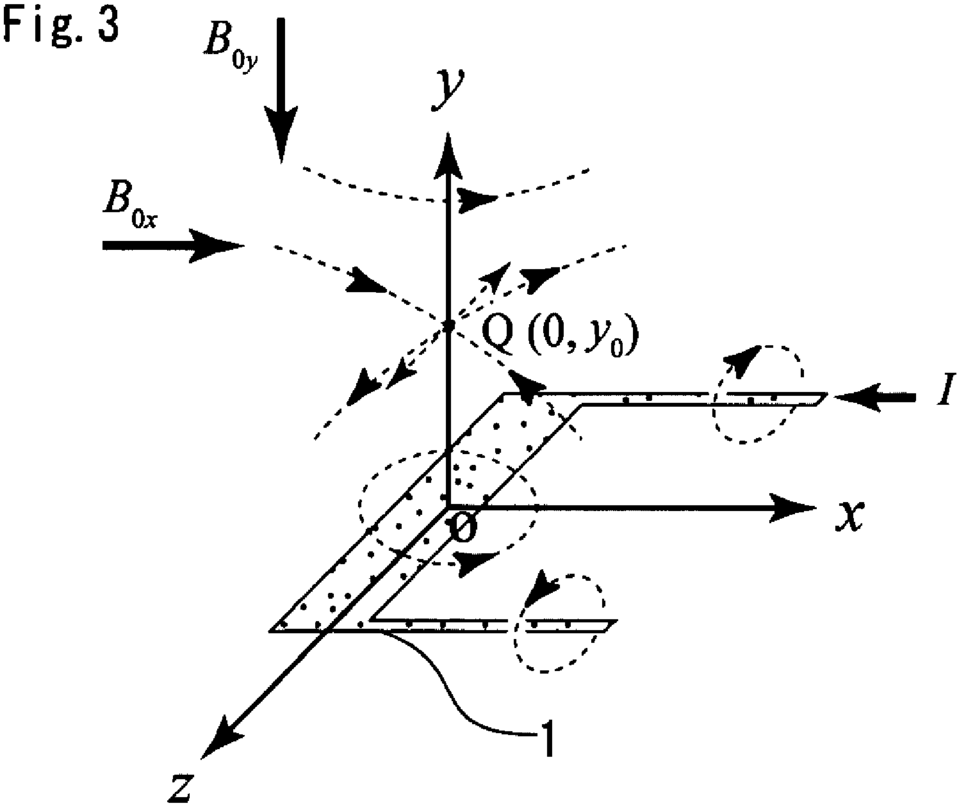
FIG. 3 is a conceptual diagram showing the condition of a three dimensional magnetic field wherein the width of a linear conductor in FIG. 2(*b*) is enlarged in the x-direction.
Figure 7:
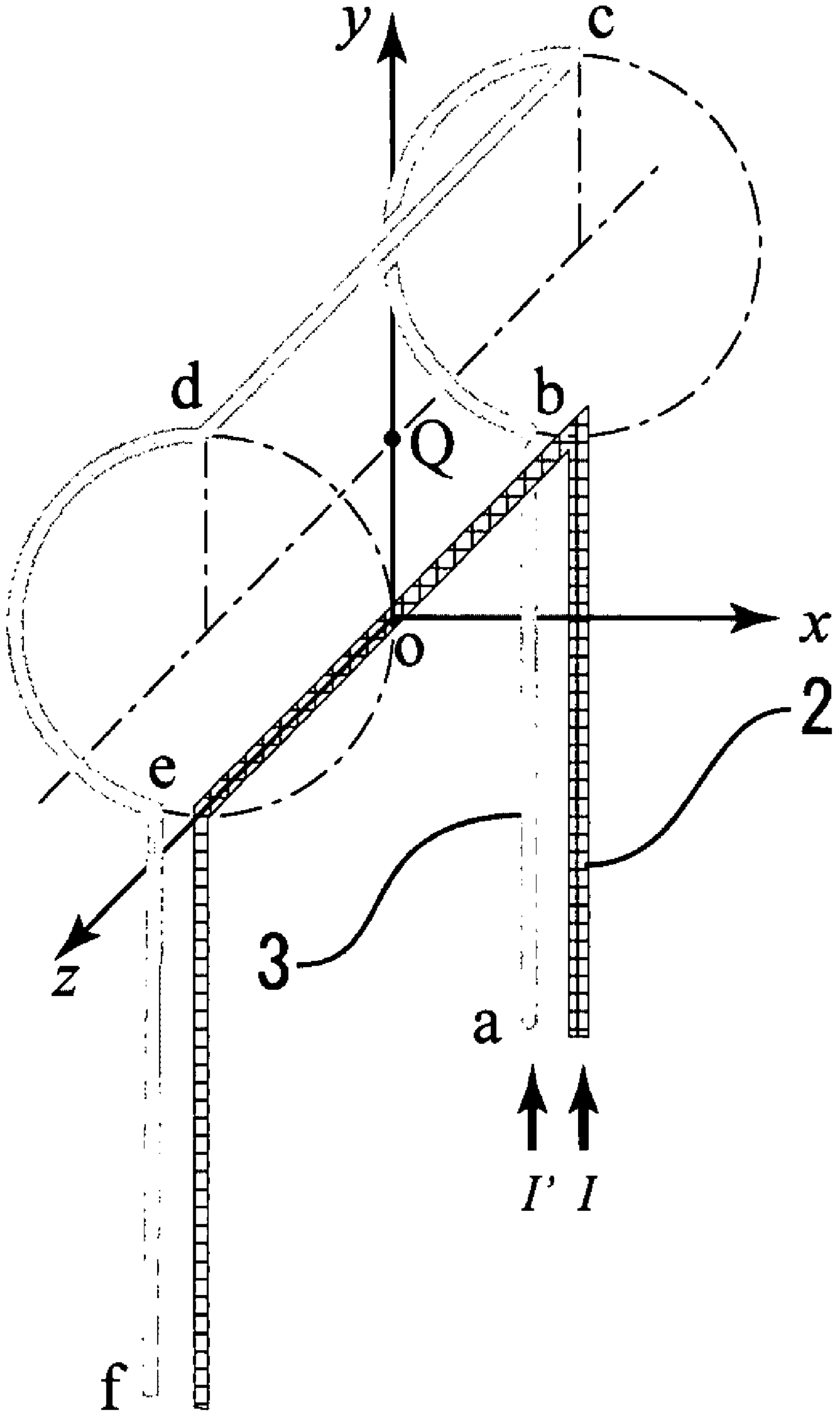
FIG. 7 is a conceptual diagram showing an example of a wiring which does not block the leaser beams.

When transparent conductive oxides, for instance, are used for a conductive material, the arrangement for irradiating the laser beams through an electrode is also possible. However, it is more desirable to devise the placement so as not to block the laser beams. FIG. 7 is a conceptual diagram showing an example of a wiring which does not block the leaser beams. In FIG. 7, “2” indicates the main current electrode and “3” indicates the electrode for sub-current. As indicated in FIG. 7, when the electric current I' flows through along the conductor in the order of a→b→c→d→e→f; then, the quadrupole on the point Q gets strengthened while the hexapole is to be canceled out by the electric current flowing in-between the principle part c-d. The b-c and d-e portions which extend downwardly in the semicircular portion from both tips of c-d are bent in order for the laser beams to detour, and also produce the effect contributing to the formation of a z-directed magnetic field as a part of anti-Helmholtz coils as shown in FIG. 2(*a*). Furthermore, a-b and e-f parts extending vertically downwardly contribute to forming an x-directed bias electric field. In addition, a neutral atom device relating to this aspect can appropriately adopt the above mentioned configuration.

[S-Shaped Electrode]

A neutral atom trapping device according to the second aspect of the present invention is one that by bending Ioffe bars, which have been Z-shaped, in a right angle to form an S-shaped structure, the generation of a bias magnetic field component in the z-direction can be reduced, the curvature at a z-directed magnetic field can be increased, a bias magnetic field in the x-direction can be enhanced. As a result, it is made possible to obtain the same degree of ability to capture neutral atoms with lesser electric current than the prior art. Namely, a neutral atom trapping device according to the second aspect of the present invention is provided with: when a point of origin is set at a point below a central portion where neutral atoms are captured, a z-axis is set to a direction of the linear portion of a multipole-magnetic field-generating electrode near a center where said neutral atoms are captured and a center where the neutral atoms are captured is provided on the y-axis, said multipole-magnetic field-generating electrode includes; a linear portion extending along the z-axis through said point of origin; a portion extending in a direction parallel to the x-axis from said linear portion; and a portion parallel to the z-axis extending from the two portions extending in a direction parallel to the x-axis. As described above, by forming an S-shaped structure by further bending the Ioffe bar of a Z-shaped conductor in right angle, generation of a z-directed bias magnetic field component can be reduced while reinforcing the curvature in a z-directed magnetic field, as well as reinforcing an x-directed bias magnetic field. As a result, it is made possible to obtain the same degree of ability to capture neutral atoms with lesser electric current than the prior art.

FIG. 8 is a conceptual diagram showing a new conductor in which both arms extending towards the x-axis (the Ioffe bars), which is used often for surface magnetic traps in a conventional Z-shaped conductor, are bent in the z-direction. This S-shaped conductor is provided with: a portion A which is a part extending along the z-axis through the point of origin; a portion B which is a part extending (a little) in parallel to the x-axis from both ends of the portion A; and a portion C which is a (long) portion further bending at both ends of portion B and then extending in parallel to the z-axis. A quadrupole magnetic field is formed near the point Q by overlapping the externally provided bias magnetic field directing in the x-axis with the electric current passing through the portion A; and a magnetic trap is formed when a z-directed non-uniform magnetic field is formed on the point Q by the electric current flowing through the portion B.

The most significant difference between the S-shaped conductor in the present invention and the conventional Z-shaped conductor in the prior art resides in the length of the portions corresponding to the portion B. Because the portion corresponding to the portion B was elongated in x-direction in the prior art method (a Z-shaped conductor), the component for a z-directed bias magnetic field formation with the positive direction (a dipole magnetic field) is strongly generated; therefore it was required to add the z-directed strong bias magnetic field with the negative direction from outside in order to cancel it out. In addition, because the portion corresponding to the portion B is a long linear conductor, the required curvature of the magnetic field for confining atoms in the z-direction, was small. On the contrary, since the present invention with the S-shaped conductor enables to shorten the portion B adequately, it can regulate the bias magnetic field with the positive direction on the z-axis; thereby, adding a strong z-directed bias magnetic field from outside becomes no longer necessary. Furthermore, since it can shorten the portion B adequately, the curvature of the magnetic field generated in the z-direction increases (the strength of the magnetic field for the infinitely long conductor is inversely proportional to the distance from electric current; on the other hand, the strength of the magnetic field for the short conductor (an infinitesimal electric current) is inversely proportional to the squared distance from electric current), thereby it enables to obtain deeper trapping potentials. In addition, the specific length of the portion B varies greatly depending upon: the scale of a neutral atom trap, the external magnetic field, the desired precision, etc. In any case, it is enabled to shorten the portion B as compared to the conventional Z-shaped conductor in prior art. An approximate value of 1-5 mm can be used as a specific length for the portion B.

In the present invention concerning the S-shaped conductor, by adding a portion C which was absent in the conventional Z-shaped conductor in the prior art, the x-directed bias magnetic field around the point Q gets enhanced by the electric current running through this portion. Thus, it is enabled to capture atoms effectively with less electric current. By composing a surface magnetic trap, etc., using the S-shaped conductor, enables to compose a magnetic trap with smaller electricity as compared to using the conventional Z-shape conductor in prior art.

In the magnetic trap, the symmetry of the magnetic field distribution is not so important; so that a design concerned with higher order multipoles is not needed as in the present invention according to the first aspect of a neutral atom trapping device. However, if the projected angle between the two vectors from point Q to two of the portions C is more than 90°, it enables to enhance the quadrupole magnetic field around the point Q by the electric current flowing though the portions C; hence preferable.

A part of the conductor, where the sub-current $I_2$ flows and which is adopted in the first aspect of the present invention of a neutral atom trapping device, can also be served as the portion C of the S-shaped conductor adopted in the second aspect of the current invention of a neutral atom trapping device. Therefore, the effect which each configuration brings by can be obtained simultaneously by adopting these configurations.

By integrating the magneto-optical trap, as explained in the first and/or second aspect of the present invention of a neutral atom trap, with a magnetic trap; it becomes suitable for further miniaturization in the course of the actual implementation. FIG. 9 is a conceptual diagram showing an example in which the electric current I, flowing through a pair of sub-current electrodes (conductors) in the first aspect of the present invention of a neutral atom trapping device also serves as the portion C in the second aspect of the present invention of a neutral atom trapping device. When the present invention of a neutral atom trapping device is used as a surface magneto-optical trap of a hexapole compensated type, only the electric current I, and I, are required; when it is used as a S-shaped surface magnetic trap, only the electric current I, is required. In addition, although the three conductors are electrically shortened each other by the Ioffe bars in FIG. 9, if each conductor is driven independently with an independent constant current source as shown in FIG. 9, then, due to the electric energy-conversion law, there is to be no hindrance in terms of the function as long as it is used as a hexapole compensating surface magneto-optical trap wherein no electric current flows through the Ioffe bars.

When only the structure of the conventional conductor as shown in FIG. 2 is used, the occupied area of a whole conductor including the wiring parts for applying electric current on the x-z plane becomes considerably large. But in the structure shown in FIG. 9, since most of the parts are concentrated in a small area along the z-axis, the total occupied area hardly differs from FIG. 4, in that it is easy to integrate and becomes suitable for miniaturization.

In addition, since a steeper magnetic gradient is required in a magnetic trap than in a magneto-optical trap, it is commonly so designed that the center Q in the trap comes as close to the conductor as possible, as such, the projected angle from the two conductors, where the subsidiary current $I_2$ is applied, to the point Q on the magnetic trap becomes larger than 90°, thereby the quadrupole magnetic field on the x-y plane is enhanced; as a result, it becomes more desirable.

Figure 10:
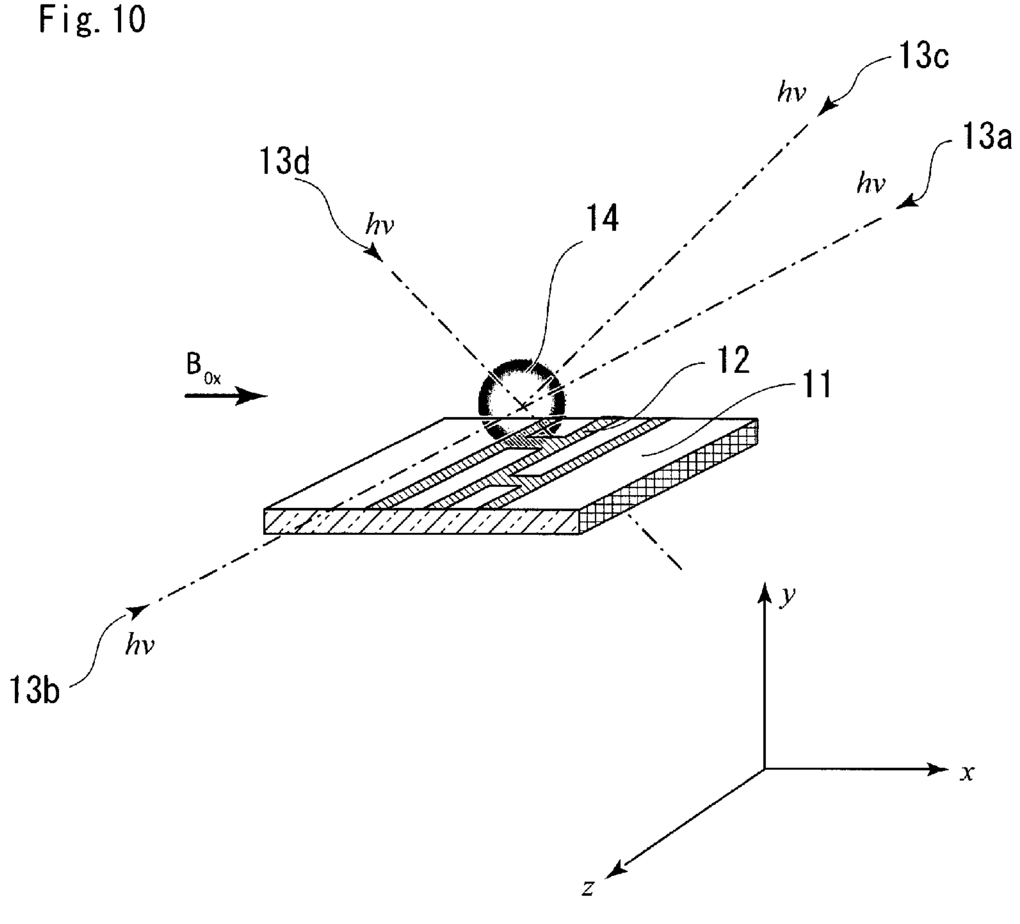
FIG. 10 is a conceptual diagram of a surface magneto-optical trap.

FIG. 10 is a conceptual diagram of the surface magneto-optical trap. As shown in FIG. 10, the neutral atom trapping device according to such an embodiment sets up a total reflection mirror (11) on the x-z plane forming the electrode (12) thereon. Furthermore, although the electrode (12) is illustrated in FIG. 9, the electrode structure as shown above can appropriately be adopted for use. Also, impressing the bias magnetic field ($B_{0x}$) towards the x-axis, and the four lasers (13*a*, 13*b*, 13*c* and 13*d*) are to be propagated towards the center of the captured atomic cloud (14).

EXAMPLE 1

Figure 11A:
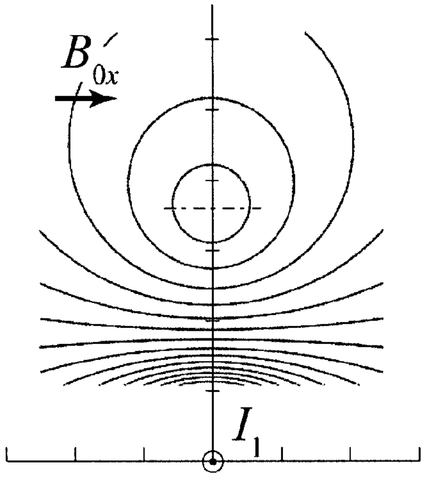
FIGS. 11(*a*) and 11(*b*) are graphs showing the calculation result comparing the structure of two-dimensional magnetic field generated by the main current $I_1$ alone, with that generated by the cancellation process of the hexapole magnetic field when both the main current $I_1$ and the sub-current $I_2$ are used.
Figure 11B:
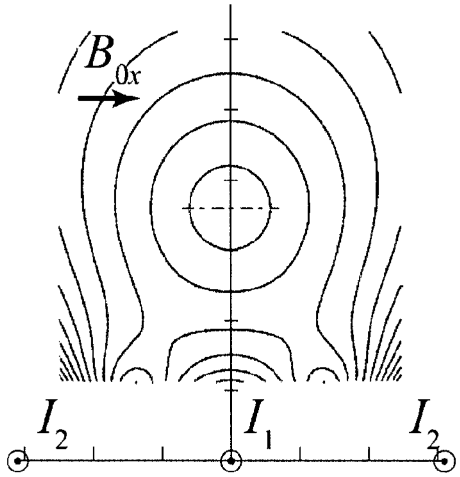

Analasys for Equal Magnetic Potentials Wherein Sub-Currents are Placed in Parallel to Main Current FIGS. 11(*a*) and 11(*b*) show calculation results comparing a shape of two-dimensional magnetic field generated by the main current $I_1$ alone, with that generated by canceling a hexapole magnetic field using the main electric current $I_1$ together with the sub-current $I_2$. FIGS. 11(*a*) and 11(*b*) are graphs showing the calculation result comparing the two-dimensional magnetic field generated by the main current $I_1$ alone, with that generated by the cancellation process of the hexapole magnetic field when both the main current $I_1$ and the sub-current $I_2$ are used. FIG. 11(*a*) shows a magnetic field generated by the main current $I_1$ alone, FIG. 11(*b*) shows the behavior of the magnetic field structure in two dimensions generated by completely canceling the hexapole magnetic field using the main current $I_1$ together with the sub-current $I_2$. FIGS. 11(*a*) and 11(*b*) depict equal magnetic potential lines (lines which continuously connect the positions of equal magnetic potential $|B|$) instead of magnetic field lines.

In FIG. 11(*a*), $I_1$ is calculated as 7.2 A and in FIG. 11(*b*), the main current $I_1$ and the sub-current $I_2$ are calculated as 4.8 A and 10.8 A, respectively. In an ideal quadrupole magnetic field, the equal magnetic potential lines become concentric with equal intervals to each other. As being evident in FIGS. 11(*a*) and 11(*b*), near the center of the graph, FIG. 11(*b*) which involves sub current becomes closer to the ideal quadrupole magnetic field than that in FIG. 11(*a*).

A neutral atom trapping device of the present invention can be used for capturing and cooling neutral atoms near the surface of a plane substrate placed in an ultrahigh vacuum chamber by using both a magnetic field generated by the electric current flowing through a conductor within or on a plane substrate and a magnetic field provided from outside of a substrate if necessary.

According to a neutral atom trapping device of the present invention of with the abilities to capture neutral atoms and cool them, it may effectively be used for: a Bose-Einstein condensation-generation device; a gravimeter; an accelerometer, a gyroscope using an atom-wave interferometer; a quantum-information processing device using neutral atoms; a quantum communication device; an atom laser generator, an atom lithography or atomic clock, etc.

What is claimed is:

1. A neutral atom trapping device, comprising:

a multipole-magnetic field-generating electrode which includes;

a main current electrode where a main current flows, and a pair of sub-current electrodes, where a sub-current flows, located in parallel to both sides of said main current electrode, wherein the main current is constant, and the sub-current is constant, whereby the neutral atom trapping device captures neutral atoms with a magnetic field generated by the constant currents of said main current electrode and said sub-current electrodes.

2. The neutral atom trapping device according to claim 1, wherein said sub-current electrodes function to enhance a magnetic quadrupole component while attenuating a magnetic hexapole component in a region where neutral atoms are captured.

3. The neutral atom trapping device according to claim 1, wherein each of said main current electrode and said pair of sub-current electrodes includes a linear portion.

4. The neutral atom trapping device according to claim 1, wherein each of said main current electrode and said pair of sub-current electrodes includes a linear portion, and the linear portion in said main current electrode and the linear portions in said pair of sub-current electrodes are electrically interconnected with connecting portions which extend in a vertical direction to the electrodes.

5. The neutral atom trapping device according to claim 1, wherein: each of said main current electrode and said pair of sub-current electrodes includes a linear portion; the linear portion in said main current electrode and the linear portions in said pair of sub-current electrodes are electrically interconnected with connecting portions which extend in a vertical direction to the electrodes; positions where said two connecting portions and said main current electrode intersect are set on opposite sides of a position of said main current electrode corresponding to a central position where the neutral atoms are captured.

6. The neutral atom trapping device according to claim 1, wherein one or more of said main current electrode and said pair of sub-current electrodes include: a linear portion; and portions bending at one or both ends of said linear portion towards the opposite of the central position where neutral atoms are captured.

7. The neutral atom trapping device according to claim 1, wherein one or more of the said main current electrode and said pair of sub-current electrodes include: a linear portion; and U-shaped portions having a linear portion and bending portions at both ends of said linear portion.

8. The neutral atom trapping device according to claim 1, further comprising an optical beam generating portion for irradiating optical beams into a multipole magnetic field generated by said multipole-magnetic field-generating electrode.

9. The neutral atom trapping device according to claim 1, which functions as a surface magneto-optical trap, further comprising: an optical beam generating portion for irradiating optical beams from four directions along a symmetric axis of a magnetic quadrupole component into a multipole magnetic field generated by said multipolemagnetic field-generating electrode; and a total reflection mirror.

10. The neutral atom trapping device according to claim 1, further comprising an optical beam generating portion for irradiating optical beams from six directions along a symmetric axis of a magnetic quadrupole component into a multipole magnetic field generated by said multipole-magnetic field-generating electrode, but not comprising a total reflection mirror.

11. A neutral atom trapping device comprising:

a multipole-magnetic field-generating electrode which includes;

a main current electrode where a main current flows; and a sub-current electrode which is provided on an opposite side of said main current electrode through a region where neutral atoms are captured and which includes a linear portion where a sub-current flows, wherein the main current is constant, and the sub-current is constant, whereby the neutral atom trapping device captures neutral atoms with a magnetic field generated by the constant currents of said main current electrode and said sub-current electrodes.

12. The neutral atom trapping device according to claim 11, wherein said sub-current electrode further including; a linear portion which is provided on an opposite side of said main current electrode through a region where neutral atoms are captured, curved portions extending from both ends of said linear portion towards the main current electrode; a linear portion extending from said curved portion to an opposite side of a central position where neutral atoms are captured.

13. The neutral atom trapping device according to claim 11, wherein said sub-current electrode further including; a linear portion which is provided on an opposite side of said main current electrode through a region where neutral atoms are captured, a semicircular portion extending from said linear portion towards the main current electrode; a linear portion extending from a bottom end of said semicircular portion to an opposite side of a central position where neutral atoms are captured.

14. The neutral atom trapping device according to claim 11, wherein when a point of origin is set at a position of the main current electrode corresponding to a central portion where neutral atoms are captured, a z-axis is set to a direction of the linear portion of a multipole-magnetic field-generating electrode near a center where said neutral atoms are captured and a center where the neutral atoms are captured is provided on the y-axis, said multipole-magnetic field-generating electrode includes; a linear portion extending along the z-axis through said point of origin; a portion extending in a direction parallel to the x-axis from said linear portion; and a portion parallel to the z-axis extending from the two portions extending in a direction parallel to the x-axis, whereby the neutral atom trapping device captures neutral atoms with a magnetic field generated by applying a constant current to said multipole-magnetic field-generating electrode.

15. The neutral atom trapping device according to claim 11, wherein said main electrode, the linear portion of said sub-current electrode, and a central position of the region where neutral atoms are captured exist on a single plane.

16. A neutral atom trapping device, comprising:

a multipole-magnetic field-generating electrode which includes:

a main current electrode where a main current flows, and a pair of sub-current electrodes, where a sub-current flows, located in parallel to both sides of said main current electrode, wherein said main current electrode and said sub-current electrode exist on a single plane, wherein the main current is constant, and the sub-current is constant, whereby a magnetic field generated by the constant currents of said main current electrode and said sub-current electrodes forms a region where neutral atoms are captured above the single plane over said main current electrode, and thereby the neutral atom trapping device captures neutral atoms with the magnetic field.

17. The neutral atom trapping device according to claim 16, wherein said main current electrode has a width indicative of a dimension on the single plane, and a thickness indicative of a dimension in a vertical direction to the single plane, and wherein the width is larger than the thickness.

18. The neutral atom trapping device according to claim 16, wherein each of said sub-current electrodes has a width indicative of a dimension on the single plane, and a thickness indicative of a dimension in a vertical direction to the single plane, and wherein the width is larger than the thickness.

* * * * *